Nov. 15, 1949        G. P. LUNT        2,487,884
VAPOR-COMPRESSION DISTILLATION

Filed Dec. 12, 1945        2 Sheets-Sheet 1

INVENTOR
GEORGE P. LUNT
BY
Kenyon & Kenyon
ATTORNEYS

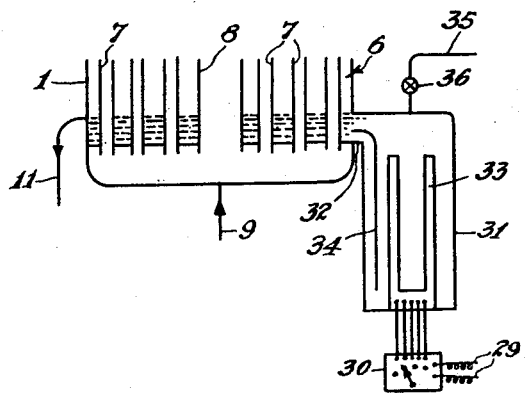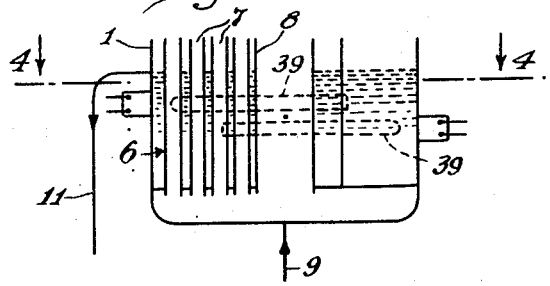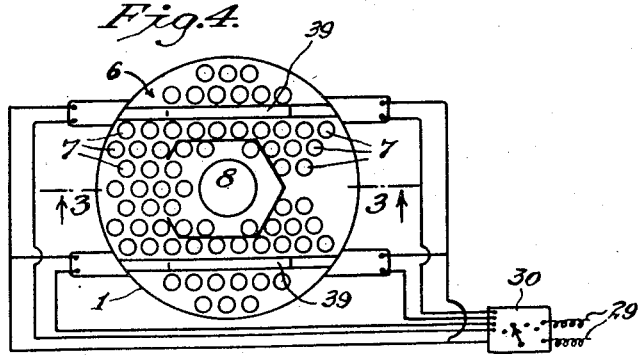

Patented Nov. 15, 1949

2,487,884

UNITED STATES PATENT OFFICE 2,487,884

VAPOR-COMPRESSION DISTILLATION

George P. Lunt, Wellesley Hills, Mass., assignor to Arthur D. Little, Inc., Cambridge, Mass., a corporation of Massachusetts Application December 12, 1945, Serial No. 634,603

14 Claims. (Cl. 202—75)

This invention relates to apparatus for, and method of distillation, and relates particularly to improvements in distillation of the vapor compression type, namely, a distillation operation wherein vapor evolved from a solution undergoing distillation is compressed until its condensing temperature is above the boiling point of the solution, and is thereafter condensed in out-of-contact heat exchange relation with the solution to give up its heat of vaporization to the boiling solution.

The term "distillation" is used herein in a broad sense in reference to operations which are commonly referred to as evaporation, fractionation, rectification, concentration and the like, and which are characterized by the evaporation of a portion of a liquid mixture for the purpose of separating two or more substances by reason of their differences in boiling point or volatility. Any such mixture which is liquid during some portion of the process is referred to herein, for the sake of brevity, as a "solution," and may be any more or less concentrated solution of solids, liquids or gases in liquids, or liquid mixtures of materials normally in the solid or gaseous form in the pure state.

In a distillation operation of the vapor-compression type, the primary source of energy is supplied in the form of mechanical power used to operate the compressor. A distillation operation of the vapor compression type can be successfully carried on using the power supplied to operate the compressor as the sole source of energy, but in such case experience has shown that heat losses must be carefully husbanded by effecting as complete heat transference as possible between incoming and outgoing effluents and by thoroughly insulating the parts of the apparatus that are operated above normal atmospheric temperature.

In order that less stringent precautions against heat losses may be exercised, thereby minimizing the cost of construction of distillation apparatus of the type in question and facilitating its operation, sensible heat may be supplied to the system to compensate for heat losses and to maintain the system in proper operational balance.

It is a purpose of this invention to supply sensible heat to a distillation operation of the vapor compression type by a novel apparatus and method which has the advantage that it does not disturb the normal functioning of the system and avoids occurrence of scale deposits, corrosive action, and other difficulties. If, for example, the heating element used to heat the solution to be distilled is in direct contact therewith, the tendency to scale formation is encountered, for practically all liquids which are distilled have a tendency to scale the heating surface. Many liquids undergoing distillation likewise have a corrosive effect upon the heating surface requiring use of special materials and special constructions. According to the present invention, such difficulties have been overcome while at the same time sensible heat may be supplied to the solution undergoing distillation.

It is a feature of this invention that in a vapor compression distillation system, improved means are provided whereby the condensate resulting from condensation of compressed vapor in the condenser heat exchanger is heated so as to cause evolution of vapor from such condensate and whereby the evolved vapor is condensed in out-of-contact heat exchange relation with solution within the vaporization chamber so as to supply the heat of condensation of the vaporized condensate to the solution within the vaporization chamber. According to this invention this is accomplished by the provision of means whereby the condensate that is formed in the condenser heat exchanger is collected and brought into contact with a heating element that presents a heated surface so as to regenerate vapors which are recondensed in out-of-contact heat exchange relation with solution undergoing distillation in the vaporization chamber. By this arrangement a simple refluxing cycle can be maintained wherein the condensate is vaporized and wherein the vapor so produced is recondensed and returned by gravity to the heating element. By utilizing gravitational flow for bringing condensate into contact with the heating element any mechanical devices such as pumps, compressors, or the like, can be eliminated and a simple system for heat transference can be provided wherein the condensate and vapor evolved therefrom act as the heat transfer medium for transferring heat from the heated surface to solution undergoing distillation in the vaporization chamber. Preferably the heat transference is accomplished by utilizing a cycle wherein the condensate that is formed in the condenser heat exchanger comes into contact with the heated surface by simple gravitational flow and the vapors resulting from the vaporization of the condensate are recondensed in the condenser heat exchanger itself and can flow back for contact with the heated surface. This may be accomplished by locating a heating element in the interior of the condenser heat exchanger itself and at a point where the condensate formed in the condenser heat exchanger will come in contact therewith. Alternatively, the condensate may be collected in a sump or collecting chamber that is outside the condenser heat exchanger and from which the vapors formed by contact with the heated surface of the heating element return for condensation in out-of-contact heat exchange relation with solution in the vaporization chamber, such vapors preferably being reintroduced into the condenser heat exchanger itself. By any of the foregoing arrangements the heated surface of the heating element is maintained out-of-contact with the solution in the vaporization chamber and the condensate and vapor evolved therefrom are used for heat transference in a manner that is effective and simple and does not interfere with the operation of the system as a whole.

Further purposes, features and advantages of this invention will be apparent from the following description of a typical embodiment of the invention in connection with the accompanying drawings, wherein:

Fig. 2 is a schematic elevation showing the lower portion only of the vaporization chamber of the distillation unit of Fig. 1, in combination with an alternative form of collecting chamber;

Fig. 3 is a schematic elevation similar to Fig. 2 and showing an alternative means for causing vaporization of condensate formed in the condenser heat exchanger, Fig. 3 being on the line 3—3 of Fig. 4;

Fig. 4 is a plan view largely in section of the embodiment of this invention shown in Fig. 3 and taken on the line 4—4 of Fig. 3.

Figure 1:
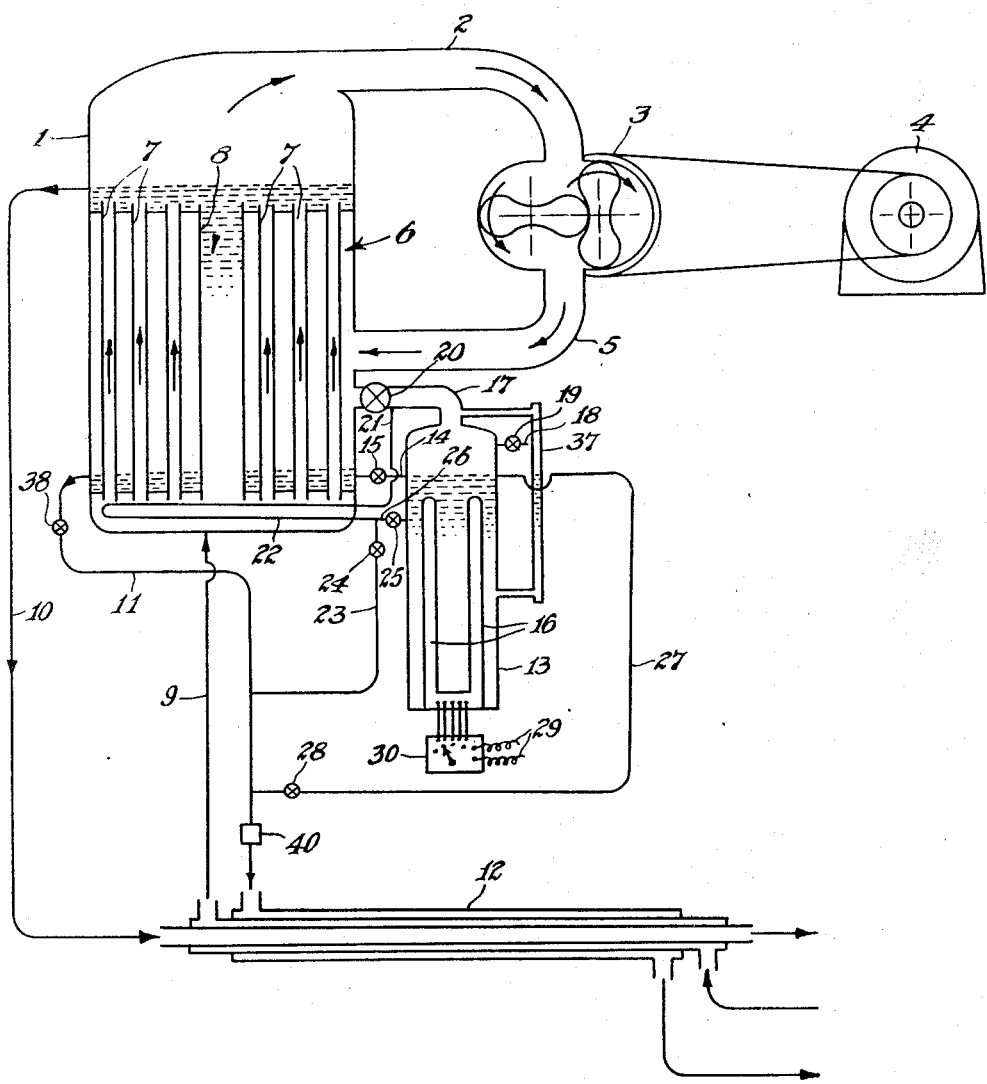
Fig. 1 is a schematic elevation of a distillation unit embodying the present invention.

Referring to the accompanying drawings, and particularly Fig. 1, the boiling of solution in order to separate vapor therefrom takes place in the vaporization chamber 1. The evolved vapor is directed by the low pressure vapor line 2 to the compressor 3 which is adapted to compress the vapor to a pressure such that the condensing temperature of the vapor is above the boiling point of the solution and which is operated by any suitable source of power such as the motor 4. While a rotary type compressor is shown, any other suitable compressor may be employed.

The compressed vapor is directed by the compressed vapor line 5 to the condenser heat exchanger which is indicated generally by the reference character 6 and which is shown as consisting of a plurality of vertically disposed tubes 7 within which boiling solution rises and which are surrounded by the condensing vapor directed into the condenser heat exchanger by line 5. The unvaporized concentrated solution is recirculated by passing downwardly within the downcomer 8. While one type of typical condenser heat exchanger has been shown in the drawing, any other type of condenser heat exchanger adapted for condensing vapor in out-of-contact heat exchange relation with a boiling solution may be employed. Due to the relatively small outlet for condensate from the condenser heat exchanger and the frictional resistance of the condensate in the effluent line, the desired back pressure for maintaining the condensing temperature of the condensing vapor above the boiling point of the solution is maintained. Alternatively, in instances where the construction or the operating conditions are such that condensate volume is below the full capacity of the effluent line 11, it is generally desirable to provide a steam trap 40 in the effluent line.

Fresh solution to be distilled is fed into the vaporization chamber by the line 9. Concentrated solution is taken from the vaporization chamber by the line 10, and the overflow level of liquid escaping into this line may conveniently determine the liquid level of the solution within the vaporization chamber. The condensate is directed from the condenser heat exchanger by the line 11. In systems of this type the heat losses are conserved by preheating the incoming feed by out-of-contact heat exchange with the effluent hot condensate and hot concentrated solution as in the preheater heat exchanger 12.

Distillation apparatus of the vapor compression type, as thus far described, is known and for this reason has been shown merely schematically in connection with a typical unit. It is apparent, however, that distillation apparatus of the vapor compression type may take many different forms.

According to the present invention, sensible heat is supplied to the vapor compression distillation system in the novel manner and using the novel apparatus described below and illustrated in the accompanying drawings. Referring to the embodiment of this invention shown in Fig. 1, a collecting chamber 13 is provided, which is supplied with condensate from the condenser heat exchanger 6 by gravitational flow through the line 14. The rate of flow of condensate into the collecting chamber is controlled in any suitable manner as by means of the valve 15, which may be manually operated or which may be automatically operable responsive to the level of liquid within the collecting chamber, e. g., by means of a float (not shown). Alternatively, the rate of flow may be maintained at the desired rate by predetermined selection of the flow capacity of the line 14. As shown, the draw-off line 11 is connected to the condenser heat exchanger 6 slightly above the bottom thereof so as to provide a supply of collected condensate in the bottom of the condenser heat exchanger for being taken off by line 14 to the collecting chamber 13.

The liquid within the collecting chamber is heated in any suitable way, as by means of an electrical heating unit 16 of the immersion type, although any other heated surface, e. g., provided by steam coils or the like, may be employed. The vapor that results from boiling of liquid within the secondary vaporization chamber 13 is directed by the line 17 to the interior of the condenser heat exchanger 6 wherein the vapor becomes commingled with the vapor entering the condenser 6 by line 5. Suitable control means for controlling the amount of heat supplied to the heating unit in the collecting chamber may be provided as desired. Thus, in the case of the electrical heating element 16, the power supplied thereto from the electrical power supply lines 29 may be controlled by means of a control device 30, which may for example be a rheostat, or preferably a series of switches operating to switch on or off portions of the heating element 16 which would accordingly be in the form of multiple heating units. If some other source of energy is used such as steam, a similar control can be effected as by the use of a suitable valve.

The collecting chamber 13 is desirably provided with a sight glass 37 for indicating the liquid level therein. A line 18 controlled by valve 19 may also be provided for initially introducing liquid to be vaporized into the collecting chamber, which is ordinarily desirable at the commencement of a distillation operation.

The vaporization chamber and other parts of the unit ordinarily are covered with thermal heat insulation material (not shown) so as to minimize heat loss, but in the practice of this invention the completeness of the heat insulation can be reduced while still maintaining the desired heat balance in the system.

In the operation of the above-described apparatus, the condensate which flows from the condenser heat exchanger 6 to the collecting chamber is vaporized and returned to the condenser heat exchanger for condensation therein. In such case, all of the condensate produced in the distillation apparatus is ultimately withdrawn by the line 11, the valve 38 therein being open and the valve 28 in line 27 being closed. If desired, all of the condensate condensed in the condenser heat exchanger 6 may be taken to the collecting chamber 13 by the line 14 for partial revaporization of the condensate and with return of revaporized condensate to the condenser heat exchanger, and the condensate may be withdrawn from the system by taking it from the collecting chamber by the line 27, the valve 28 therein being open and the valve 38 in line 11 being closed. In each of the arrangements above described, it is apparent that the condensate in the collecting chamber 13 and the vapor evolved therefrom is continuously maintained at the pressure prevailing within the condenser heat exchanger 6 and that the indirect heat transference is maintained merely by gravitational refluxing of the condensate. Moreover, each arrangement is such that the indirect heat transference can be maintained independently of the withdrawal of condensate from the system and even when the withdrawal of condensate from the system is completely cut off.

The above-described apparatus represents a preferred embodiment of this invention. While it is much to be preferred that the vapor evolved in the collecting chamber be discharged into the condenser heat exchanger 6 for condensation in out-of-contact heat exchange relation with the solution in the primary vaporization chamber 1, any other means for directing the vapor generated in the collecting chamber 13 into out-of-contact heat exchange relation with solution within the vaporization chamber 1 may be employed. Thus, by closing the valve 20 in line 17, the vapor can be directed by line 21 through a coil 22 for condensation in out-of-contact heat exchange relation with solution within the vaporization chamber 1 (the line 21 being shown schematically for clarity). The resulting condensate can be discharged from the system by line 23 when the valve 24 is open and the valve 25 is closed, or may be returned to the collecting chamber 13 by line 26 when the valve 25 is open and the valve 24 is closed. When the condensate is discharged from the system by the line 23, the valve 24 should ordinarily be of the pressure relief type so that a back pressure will be maintained that is sufficiently high to effect condensation of the vapor generated in the collecting chamber in the coil 22, namely, the pressure of the vapor in the coil 22 must be such that the condensing temperature of the vapor is above the boiling point of the solution in chamber 1. However, by connecting the line 23 to the line 11, as shown, the back pressure provided by the frictional resistance of the preheater heat exchanger 12 is ordinarily sufficient to insure condensation of the vapor, produced by boiling the condensate in the collecting chamber 13, in the coil 22 and the employment of a pressure-relief type of valve such as the valve 24 is not necessary. If the condensate formed in coil 22 is returned to the collecting chamber 13 by line 26, the desired pressure is automatically maintained. In the alternative embodiment wherein vapors evolved from condensate are condensed in coil 22, any make-up liquid can be supplied to the collecting chamber 13 by line 14 or by line 18, or by both, as may be desired. While such alternative embodiment may be employed, the valve 20, the coil 22 and the lines 21, 23 and 26 are omitted in normal practice of this invention, since the apparatus is greatly simplified by so doing and since the operation is better controlled when the vapors from the collecting chamber 13 are directed into the condenser heat exchanger 6 for condensation therein. The introduction of vapors from the collecting chamber into the condenser heat exchanger can be accomplished in other ways than that shown, however, as, for example, by introducing vapors from the collecting chamber 13 into the vapor line 5.

The operation of the improved vapor compression distillation of this invention may be illustrated as follows. Liquid, which is ordinarily identical with the liquid to be recovered as distillate from the unit, is first introduced into the collecting chamber 13 and solution to be distilled is introduced into the vaporization chamber 1. The heat is supplied to the heating unit 16, which causes the liquid in the collecting chamber 13 to boil, thereby supplying vapor which is taken to the condenser heat exchanger 6 and which condenses therein giving up its heat of vaporization to the solution in chamber 1. The compressor is likewise placed in operation so that, as soon as the heat supplied to the solution in chamber 1 causes the solution to give up a substantial amount of vapor, such vapor will be compressed and returned to the condenser heat exchanger 6. Eventually, the rate of distillation is increased until the desired operating conditions are attained, the supply of feed and the withdrawal of concentrated solution being maintained at the desired rate, the heat supplied by the heating unit 16 being regulated so as to maintain the proper thermal balance in the system.

The method and apparatus of this invention may be advantageously employed in the recovery of distilled potable water from sea water. In order to afford a specific example of the practice of this invention, the application of this invention to the distillation of sea water is described below.

Upon starting up the distillation operation, distilled water is used to initially fill the collecting chamber 13 and cold sea water is run into the vaporization chamber 1 until the normal liquid level is reached. The heating element 16 is then energized to boil the distilled water in the secondary vaporization chamber and the compressor 3 is started. The sea water in the vaporization chamber is thereby brought up to its boiling point and the normal conditions for a continuous distillation operation are established, whereupon the feed of fresh sea water is started and distillate and concentrated solution are withdrawn from the system. During a typical continuous distillation operation, the incoming feed of sea water is preheated in the preheater heat exchanger 12, by out-of-contact heat exchange with the effluent distillate and concentrated solution, to a temperature of the order of 190° F. to 210° F. The water vapor separated from the sea water in the vaporization chamber 1 is taken to the compressor 3 which boosts the pressure to 3 to 5 pounds per square inch gauge pressure for introduction into the condenser heat exchanger 6 wherein it condenses and gives up its heat of condensation to the solution within the vaporization chamber 1. The resulting condensate is taken from the condenser heat exchanger 6 to the preheater heat exchanger 12 at a temperature of the order of 220° F. to 230° F., where it gives up its sensible heat to the incoming feed.

About two-thirds of the sea water fed into the system is vaporized in the vaporization chamber 1 and about one-third is taken from the system as concentrated solution or brine which enters the preheater heat exchanger 12, at a temperature of the order of 214° F. The distillate is cooled in the preheater heat exchanger 12 to within about 10° F. of the temperature of the incoming feed and the hot concentrated solution is cooled in the preheater heat exchanger 12 to within about 30° F. of the temperature of the incoming feed. In order to compensate for heat losses which take place in the system, sensible heat is introduced into the system, this being accomplished according to the present invention by boiling a portion of the condensate and condensing the vapor thus produced in out-of-contact heat exchange relation with the sea water in the vaporization chamber 1. In a unit of the character described producing about 50 gallons of distilled water per hour, it has been found to be advantageous to consume about 3.4 to 4 kilowatts per hour for operating the compressor 3 and about 3 to 3.5 kilowatts per hour for supplying electrical energy to heat the electrical heating element 16 which is in direct contact with the condensate in the collecting chamber 13.

In connection with the foregoing description of distillation of sea water according to this invention, it may be mentioned that sea water has a pronounced tendency to deposit scale and also has a corrosive effect on ordinary heating units placed in direct contact with the solution within the vaporization chamber. When the distillation of sea water was carried out according to this invention, no difficulty was experienced from scaling or corrosion. Moreover, the distillation unit was readily adjusted for maintaining distillation at the desired rate while compensating for heat losses by supplying heat to the main heat exchange surfaces of the condenser heat exchanger through the expedient of bringing condensate formed in the condenser heat exchanger into contact with the heating element in the collecting chamber, reboiling of condensate therein, and then recycling of the resulting vapor for condensation again in the condenser heat exchanger.

It is apparent that the practice of this invention can be varied. An embodiment of this invention which is somewhat simpler in construction than the embodiment shown in Fig. 1 is shown in Fig. 2. In Fig. 2, the lower portions only of the vaporization chamber 1 and of the condenser heat exchanger 6 are shown, it being understood that, except for the collecting chamber arrangement, the distillation unit is the same as that shown in Fig. 1.

In Fig. 2, the collecting chamber 31 is arranged with reference to the condenser heat exchanger 6 so as to be maintained in a flooded condition, since it is in open communication with the lower portion of the condenser heat exchanger 6 below the normal liquid level therein by the wide diameter connection 32. Within the collecting chamber is the heating element 33 which is shown for purposes of illustration as an electrical heating element supplied with power from the supply lines 29 through the control device 30. It is apparent that condensate collected in the condenser heat exchanger 6 will collect in collecting chamber 31 where it can be vaporized by supplying heat to the heating element 33, the evolved vapors being free to bubble up through the liquid condensate and to escape through the connection 32 into the interior of the condenser heat exchanger 6 for recondensation therein. In Fig. 2, a baffle 34 is shown for the purpose of assisting circulation of liquid within the collecting chamber 31, but such baffle can be omitted if desired and is not essential. Make-up liquid can be supplied to the collecting chamber 31 by the line 35 controlled by the valve 36 during the institution of distillation.

In Figs. 3 and 4, a further alternative embodiment of this invention is shown wherein a collecting chamber separate from the condenser heat exchanger is dispensed with and wherein the lower portion of the condenser heat exchanger itself affords the collecting means for bringing condensate formed within the condenser heat exchanger 6 into contact with a heating element. An embodiment of this invention, such as that shown in Figs. 3 and 4, is particularly suitable in the case of relatively small-size units. In Figs. 3 and 4, the lower portion only of the vaporization chamber 1 and of the condenser heat exchanger 6 is shown, it being understood that the parts shown are comprised in a distillation unit such as that shown in Fig. 1 except that there is no collecting chamber located on the exterior of the condenser heat exchanger.

According to the embodiment of this invention shown in Figs. 3 and 4, the heating means is disposed adjacent the bottom of the condenser heat exchanger 6 below the normal liquid level of condensate collected therein and is shown for illustrative purposes as a plurality of electrical heating elements 39 which project inwardly into the interior of the condenser heat exchanger 6 into spaces between the tubes 7 of the condenser heat exchanger. The heating elements 39 are supplied with electrical energy from the power supply lines 29 controlled by the control device 30. It is apparent that in the operation of the embodiment of this invention shown in Figs. 3 and 4, the body of condensate collected in the bottom of the condenser heat exchanger 6 may be boiled by heat supplied by the heating element 39 and that the vapor evolved from the condensate will recondense within the condenser heat exchanger and give up its heat of condensation to solution within the vaporization chamber by out-of-contact heat exchange.

While this invention has been described in connection with certain typical embodiments and examples of the practice thereof, it is apparent that variations may be made without departing from the scope of this invention as defined by the language of the folowing claims.

I claim:

1. The combination with distillation apparatus of the character described comprising a vaporization chamber, a compressor, means for directing vapor evolved from solution in said vaporization chamber to said compressor for compression therein, a condenser heat-exchanger within said vaporization chamber arranged to condense vapor in out-of-contact heat exchange relation with solution within said vaporization chamber, means for directing vapor compressed by said compressor to said condenser heat-exchanger for condensation therein, means for feeding solution to be distilled into said vaporization chamber, means for withdrawing concentrated solution from said vaporization chamber, and means for withdrawing condensate from said condenser heat-exchanger and from said distillation apparatus; of heat transfer means for transferring heat to solution in said vaporization chamber from a heating element adapted to present a heated surface, said heat transfer means comprising collecting means arranged to collect by gravitational flow condensate formed in said condenser heat-exchanger and to bring same by gravitational flow into contact with said surface of said heating element to cause evolution of vapor therefrom, said collecting means being in open communication with the interior of said condenser heat-exchanger whereby vapor evolved from condensate in contact with said surface of said heating element is recondensed in said condenser heat-exchanger to supply heat to solution in said vaporization chamber.

2. The combination with distillation apparatus of the character described comprising a vaporization chamber, a compressor, means for directing vapor evolved from solution in said vaporization chamber to said compressor for compression therein, a condenser heat-exchanger within said vaporization chamber arranged to condense vapor in out-of-contact heat exchange relation with solution within said vaporization chamber, means for directing vapor compressed by said compressor to said condenser heat-exchanger for condensation therein, means for feeding solution to be distilled into said vaporization chamber, means for withdrawing concentrated solution from said vaporization chamber, and means for withdrawing condensate from said condenser heat-exchanger and from said distillation apparatus; of heat transfer means for transferring heat to solution in said vaporization chamber from a heating element adapted to present a heated surface, said heat transfer means comprising collecting means arranged to collect by gravitational flow condensate formed in said condenser heat-exchanger and to bring same by gravitational flow into contact with said surface of said heating element to cause evolution of vapor therefrom, and means for condensing the evolved vapor in out-of-contact heat exchange relation with solution in said vaporization chamber to supply heat thereto.

3. The combination with distillation apparatus according to claim 2, of heat transfer means as defined in claim 2 wherein said heat transfer means comprises means whereby the condensate formed by condensation of the vapor produced by vaporization of condensate upon contact with said surface of said heating element is returned by gravitational flow for contact with said surface.

4. The combination with distillation apparatus according to claim 2, of heat transfer means as defined in claim 2 wherein said collecting means is adapted to collect condensate in a body of substantial depth and wherein said surface of said heating element is arranged to project into said body of condensate.

5. The combination with distillation apparatus of the character described comprising a vaporization chamber, a compressor, means for directing vapor evolved from solution in said vaporization chamber to said compressor for compression therein, a condenser heat-exchanger within said vaporization chamber arranged to condense vapor in out-of-contact heat exchange relation with solution within said vaporization chamber, means for directing vapor compressed by said compressor to said condenser heat-exchanger for condensation therein, means for feeding solution to be distilled into said vaporization chamber, means for withdrawing concentrated solution from said vaporization chamber, and means for withdrawing condensate from said condenser heat-exchanger and from said distillation apparatus; of a heating element adapted to present a heated surface, means for refluxing condensate formed in said condenser heat-exchanger by bringing the condensate formed in said condenser heat-exchanger by gravitational flow into contact with said surface of said heating element to form vapors substantially all of which are recondensed in said condenser heat-exchanger, thereby transferring heat from said surface of said heating element to solution in said vaporization chamber, and means for controlling the energy supplied to said heating element for imparting heat to said heated surface.

6. The combination with distillation apparatus of the character described comprising a vaporization chamber, a compressor, means for directing vapor evolved from solution in said vaporization chamber to said compressor for compression therein, a condenser heat-exchanger within said vaporization chamber arranged to condense vapor in out-of-contact heat exchange relation with solution within said vaporization chamber, means for directing vapor compressed by said compressor to said condenser heat-exchanger for condensation therein, means for feeding solution to be distilled into said vaporization chamber, means for withdrawing concentrated solution from said vaporization chamber, and means for withdrawing condensate from said condenser heat-exchanger and from said distillation apparatus; of means for heating a portion of the condensate to cause vaporization thereof and for condensing the so produced vapor in out-of-contact heat exchange relation with solution in said vaporization chamber in a closed cycle operable independently of the withdrawal of condensate from the apparatus wherein substantially all of the so produced vapor is condensed in out-of-contact heat exchange relation with solution in said vaporization chamber.

7. The combination with distillation apparatus of the character described comprising a vaporization chamber, a compressor, means for directing vapor evolved from solution in said vaporization chamber to said compressor for compression therein, a condenser heat-exchanger within said vaporization chamber arranged to condense vapor in out-of-contact heat exchange relation with solution within said vaporization chamber, means for directing vapor compressed by said compressor to said condenser heat-exchanger for condensation therein, means for feeding solution to be distilled into said vaporization chamber, means for withdrawing concentrated solution from said vaporization chamber, and means for withdrawing condensate from said condenser heat-exchanger; of means for maintaining a body of condensate condensed in said condenser heat-exchanger within said condenser heat-exchanger, and heating means disposed within said condenser heat-exchanger below the normal liquid level of said body of condensate condensed in said condenser heat-exchanger to cause evolution of vapor from said body of condensate in said condenser heat-exchanger for recondensation in said condenser heat-exchanger.

8. The combination with distillation apparatus of the character described comprising a vaporization chamber, a compressor, means for directing vapor evolved from solution in said vaporization chamber to said compressor for compression therein, a condenser heat-exchanger within said vaporization chamber arranged to condense vapor in out-of-contact heat exchange relation with solution within said vaporization chamber, means for directing vapor compressed by said compressor to said condenser heat-exchanger for condensation therein, means for feeding solution to be distilled into said vaporization chamber, and means for withdrawing concentrated solution from said vaporization chamber; of a collecting chamber outside of said condenser heat-exchanger, means for directing condensate from said condenser heat-exchanger to said collecting chamber, heating means for heating liquid contained in said collecting chamber to cause evolution of vapor therefrom, means for directing vapor evolved from liquid in said collecting chamber into out-of-contact heat exchange relation with solution in said vaporization chamber for condensation while in said heat exchange relation, and means for withdrawing condensate from said collecting chamber and thence out of the distillation apparatus.

9. The combination with distillation apparatus of the character described comprising a vaporization chamber, a compressor, means for directing vapor evolved from solution in said vaporization chamber to said compressor for compression therein, a condenser heat-exchanger within said vaporization chamber arranged to condense vapor in out-of-contact heat exchange relation with solution within said vaporization chamber, means for directing vapor compressed by said compressor to said condenser heat-exchanger for condensation therein, means for feeding solution to be distilled into said vaporization chamber, means for withdrawing concentrated solution from said vaporization chamber, and means for withdrawing condensate from said condenser heat-exchanger and from said apparatus; of a collecting chamber outside of said condenser heat-exchanger, means for directing condensate from said condenser heat-exchanger to said collecting chamber by gravitational flows, heating means for heating liquid contained in said collecting chamber to cause evolution of vapor therefrom, and means for directing vapor evolved from liquid in said collecting chamber into said condenser heat-exchanger for condensation in out-of-contact heat exchange relation with solution in said vaporization chamber.

10. In apparatus of the character described, the combination according to claim 9 which comprises means for directing liquid other than condensate contained in said condenser heat-exchanger into said collecting chamber.

11. In a method of distillation wherein solution to be vaporized is introduced into a vaporization zone, vapor is withdrawn from said vaporization zone, the withdrawn vapor is compressed until its condensing temperature is above the boiling point of the solution in said vaporization zone, the compressed vapor is condensed in a condenser heat-exchanger in out-of-contact heat exchange relation with solution in said vaporization zone, concentrated solution is withdrawn from said vaporization zone and out of the system, and condensate is withdrawn from said condenser heat-exchanger and out of the system; the supply of heat to solution in said vaporization zone by the steps comprising directing condensate formed in said condenser heat-exchanger by gravitational flow into contact with a heated surface, vaporizing condensate thus contacted with said heated surface, and recondensing in out-of-contact heat exchange relation with solution in said vaporization chamber substantially all of the vapor thus produced.

12. In a method of distillation according to claim 11, the supply of heat to solution in said vaporization zone by the steps recited in claim 11 wherein the vapor produced by heating condensate formed in said condenser heat-exchanger is recondensed in said condenser heat-exchanger.

13. In a method of distillation wherein solution to be vaporized is introduced into a vaporization zone, vapor is withdrawn from said vaporization zone, the withdrawn vapor is compressed until its condensing temperature is above the boiling point of the solution in said vaporization zone, the compressed vapor is condensed in a condenser heat-exchanger in out-of-contact heat exchange relation with solution in said vaporization zone, concentrated solution is withdrawn from said vaporization zone and out of the system, and condensate is withdrawn from said condenser heat-exchanger and out of the system; the supply of heat to solution in said vaporization zone by bringing condensate formed in said condenser heat-exchanger into contact with a heated surface to heat and cause vaporization of said condensate, recondensing substantially all of the vapor thus produced in out-of-contact heat exchange relation with solution in said vaporization zone, and returning condensate formed by said recondensation by gravitational flow for contact with said heated surface.

14. In a method of distillation wherein solution to be vaporized is introduced into a vaporization zone, vapor is withdrawn from said vaporization zone, the withdrawn vapor is compressed until its condensing temperature is above the boiling point of the solution in said vaporization zone, the compressed vapor is condensed in a condenser heat exchanger in out-of-contact heat exchange relation with solution in said vaporization zone, concentrated solution is withdrawn from said vaporization zone and out of the system, and condensate is withdrawn from said condenser heat-exchanger and out of the system; the supply of heat to solution in said vaporization zone by supplying heat to solution in said vaporization zone by heating condensate formed in said condenser heat-exchanger by contact with a heated surface to cause evolution of vapor therefrom, substantially all of the vapor so evolved being recondensed in said condenser heat-exchanger to form condensate that is refluxed for contact with said heated surface to complete a closed cycle, said condensate and the vapor evolved therefrom being continuously maintained at the pressure prevailing within said condenser heat-exchanger throughout said closed cycle.

GEORGE P. LUNT.

REFERENCES CITED

The following references are of record in the file of this patent:

UNITED STATES PATENTS

| Number | Name | Date |
|---|---|---|
| 760,440 | Forbes | May 24, 1904 |

FOREIGN PATENTS

| Number | Country | Date |
|---|---|---|
| 308,736 | Great Britain | May 8, 1930 |

OTHER REFERENCES

U. S. Army, Corps of Engineers, Technical Manual T. M. 5-2068 Jan. 1945 (pages 8 and 10).